US012500054B2

(12) United States Patent
Lin et al.

(10) Patent No.: US 12,500,054 B2
(45) Date of Patent: Dec. 16, 2025

(54) HIGHLY-RELIABLE INSULATING ULTRA-SMALL ELECTROMAGNETIC RELAY

(71) Applicant: Xiamen Hongfa Signal Electronics Co., Ltd., Fujian (CN)

(72) Inventors: Jiabin Lin, Fujian (CN); Xinshang Dong, Fujian (CN); Zhiyuan Su, Fujian (CN)

(73) Assignee: Xiamen Hongfa Signal Electronics Co., Ltd., Fujian (CN)

( * ) Notice: Subject to any disclaimer, the term of this patent is extended or adjusted under 35 U.S.C. 154(b) by 249 days.

(21) Appl. No.: 18/276,103

(22) PCT Filed: Feb. 17, 2022

(86) PCT No.: PCT/CN2022/076646
§ 371 (c)(1),
(2) Date: Aug. 7, 2023

(87) PCT Pub. No.: WO2022/179430
PCT Pub. Date: Sep. 1, 2022

(65) Prior Publication Data
US 2024/0145197 A1 May 2, 2024

(30) Foreign Application Priority Data
Feb. 25, 2021 (CN) ......................... 202110213966.3

(51) Int. Cl.
*H01H 50/44* (2006.01)
*H01H 50/02* (2006.01)
(Continued)

(52) U.S. Cl.
CPC .......... *H01H 50/44* (2013.01); *H01H 50/026* (2013.01); *H01H 50/043* (2013.01);
(Continued)

(58) Field of Classification Search
CPC .... H01H 50/043; H01H 50/56; H01H 50/643; H01H 51/2236
(Continued)

(56) References Cited

U.S. PATENT DOCUMENTS 4,993,787 A * 2/1991 Tanaka ................ H01H 51/229 335/78
5,153,543 A * 10/1992 Hitachi ................ H01H 51/229 335/78
(Continued)

FOREIGN PATENT DOCUMENTS

CN 201527934 U 7/2010
CN 106558460 A 4/2017
(Continued)

OTHER PUBLICATIONS

International Search Report dated May 6, 2022 in co-pending PCT Application No. PCT/CN2022/076646.
(Continued)

*Primary Examiner* — Alexander Talpalatski
(74) *Attorney, Agent, or Firm* — Thomas Horstemeyer, LLP

(57) ABSTRACT

The present disclosure provides a highly-reliable insulating ultra-small electromagnetic relay, comprising a coil portion and static spring portions. The coil portion comprises a bobbin; the bobbin comprises two flanges that are located at the two end portions of the bobbin; each static spring portion comprises a static spring provided at at least one end of the bobbin; the static spring comprises a contact portion comprising a static contact; the contact portion of the static spring is provided at the position close to the flange of the bobbin; and in each flange of the bobbin, a first retaining wall and a second retaining wall used for together limiting the position of the contact portion of the static spring in two
(Continued)

horizontal directions are respectively and upwardly arranged in a protruding mode.

11 Claims, 11 Drawing Sheets

(51) Int. Cl.
*H01H 50/04* (2006.01)
*H01H 50/36* (2006.01)
*H01H 50/56* (2006.01)

(52) U.S. Cl.
CPC ............ *H01H 50/36* (2013.01); *H01H 50/56* (2013.01); *H01H 2050/446* (2013.01)

(58) Field of Classification Search
USPC ............................................................ 335/78
See application file for complete search history.

(56) References Cited

U.S. PATENT DOCUMENTS 5,337,029 A * 8/1994 Nobutoki ............. H01H 50/043 335/83
5,617,066 A * 4/1997 Dittmann ........... H01H 51/2281 335/78
5,673,011 A * 9/1997 Okihara ................. H01H 50/14 335/78
5,880,653 A * 3/1999 Yamada ............... H01H 51/229 335/78
5,994,986 A * 11/1999 Takahashi .......... H01H 51/2272 335/83
6,014,068 A * 1/2000 Nobutoki ............... H01H 50/36 336/208
6,107,903 A * 8/2000 Sako .................... H01H 51/229 335/78
6,407,654 B1 * 6/2002 Saito .................... H01H 51/229 335/83
7,994,883 B2 * 8/2011 Kuo ..................... H01H 51/229 335/78
10,602,613 B2 * 3/2020 Shimoda ................ H01H 50/14
2010/0182109 A1 * 7/2010 Kuo ..................... H01H 51/229 335/78
2019/0272967 A1 9/2019 Chen et al.

FOREIGN PATENT DOCUMENTS

CN 208093459 U 11/2018
CN 110993445 A 4/2020
CN 211208341 U 8/2020
CN 113012988 A 6/2021
CN 214588645 U 11/2021
DE 102016117671 A1 3/2018
JP S6060852 U 4/1985
JP 1994-124635 A2 5/1994
JP 2000173431 A 6/2000
JP 2009-212094 A2 9/2009

OTHER PUBLICATIONS

JP2023-547185—1st Office Action with English.
CN202110213966.3—1st Office Action with English.

* cited by examiner

HIGHLY-RELIABLE INSULATING ULTRA-SMALL ELECTROMAGNETIC RELAY

CROSS-REFERENCE TO RELATED APPLICATIONS

The present disclosure is the U.S. National Stage filing under 35 U.S.C. § 371 of International Application No. PCT/CN2022/076646, filed on Feb. 17, 2022, which is based on and claims priority to the Chinese Patent Application No. 202110213966.3, filed on Feb. 25, 2021, the entire contents of which are incorporated herein by reference.

TECHNICAL FIELD

The present disclosure relates to the technical field of a relay, in particular to a highly-reliable insulating ultra-small electromagnetic relay.

BACKGROUND

Ultra-small electromagnetic relays, due to their small sizes, are widely used in fields such as network communication and medical equipment that require intensive installation of products. The ultra-small electromagnetic relay in the related art usually consists of a movable spring armature portion, a base portion and a housing, wherein the movable spring armature portion is generally integrally formed by combing and injection molding two sets of movable springs and an armature, and each of the two sets of movable springs is provided with a normally open end contact and a normally closed end contact, and the movable spring armature portion is welded with the static spring portion in the base portion through a material at a positioning location to form a seesaw structure, so that the normally open end contact and the normally closed end contact of the movable spring are respectively cooperated with a contact of the normally open static spring and a contact of the normally closed static spring. The welding mode may be a laser welding, a resistance welding or the like.

The base portion of such an ultra-small electromagnetic relay usually consists of a coil portion and a static spring portion. When the base portion is manufactured, a U-shaped iron core forms a bobbin portion in a first injection molding manner (as shown in FIG. 1). The bobbin portion 101 includes a bobbin 102 and a U-shaped iron core 103. The bobbin 102 includes flanges 104 provided at both ends thereof, respectively and a winding window 105 between the two flanges 104. A middle section of the U-shaped iron core 103 is wrapped in the bobbin 102. Two end portions 106 of the U-shaped iron core 103 are fitted at the two flanges 104 of the bobbin 102 respectively, and a pole surface 107 of the U-shaped iron core 103 which is fitted with an armature of the movable spring armature portion is exposed outside the bobbin 102. Next, an enameled wire 108 is wound at the winding window 105 of the bobbin 102 to form a coil portion 109 (as shown in FIG. 2). Then, a position of the static spring portion 200 is matched with that of the coil portion 109 (as shown in FIG. 3), wherein the static spring portion 200 generally includes four contact static springs 201 (i.e., two normally open static springs and two normally closed static springs), each of the contact static springs 201 includes a contact portion 202 and a lead-out pin 203, and the contact portion 202 includes a static contact 204. It is required that the working mode of such relay coil is compatible with monostable and magnetic latching specifications, therefore, it is usually necessary to have a permanent magnet 206 in the magnetic circuit structure, and the permanent magnet 206 is welded between the two end portions 106 of the U-shaped iron core 103 of the coil portion (as shown in FIG. 4). Finally, the static spring portion 200 and the coil portion 109 form a base portion 205 in a second injection molding manner (as shown in FIG. 5).

This solution of combining the base, the magnetic circuit structure and the static spring can achieve an effect of reducing volume and improving insulation capacity; however, it still has the following disadvantages:

First, the contact portions 202 of the four contact static springs 201 in X and Y directions have position consistency accuracy deficient. As shown in FIG. 5, the X direction is a length direction of the relay (i.e., a length direction along a U-shaped bottom wall of the iron core) and the Y direction is a width direction of the relay. The reason is provided as follows: in the electromagnetic relay of the related art, as shown in FIG. 3, the position of the contact portions 202 of the contact static spring 201 are not effectively limited in the X and Y directions, to cause deviation of the contact position, and thus lead to the deviation of the contacting position between the static contact and the movable contact. This deviation can easily lead to consistency of contact resistance and electrical durability between output circuits deficient, thus affect the consistency of products.

Second, a creepage distance M1 between the position of the contact portion 202 and the enameled wire 108 of the coil is generally a short position between input and output circuits (as shown in FIG. 3), there is the insulation performance deteriorate with the use of the relay, which affects the isolation between the input and output circuits. The reason is provided as follows: although the position of the contact portion 202 and the coil are separated by a plastic of the base after the combined injection molding of the base, a plastic of the bobbin (that is, a plastic for forming the bobbin) and the plastic of the base (that is, a plastic for forming the base) are usually not exactly same materials, and there are differences in the expansion rate, heat resistance and other characteristics between the materials. Moreover, since the plastic of the base and the plastic of the bobbin are processed separately with secondary machining, the bobbin is manufactured and formed first, and cleanliness of the surface of the plastic of the bobbin is inevitably affected by atmospheric factors such as air moisture after manufactured, the plastic of the bobbin and the plastic of the base cannot be completely closely combined microscopically. The combination therebetween cannot be close enough will be further deteriorated with the environmental temperature, moisture change and the like during the use of relay. Therefore, since the position of the contact portion 202 is directly exposed above the enameled wire before the injection molding of the base, the creepage distance M1 between the position of the contact portion 202 of the static spring and the coil is relatively short, and the microscopic gap between the plastic of the bobbin and the plastic of the base will become a path of voltage breakdown.

Third, a permanent magnet 206 and an iron core 103 are positioned by the laser welding. During laser welding, the heat at a spot position is generated sharply, which causes the metal at the spot position is molten or even splashed. Since the welding position is close to the pole surface 107 of the iron core, welding slags generated by liquid metal splashing is easy to be accumulated on the pole surface 107 of the iron core, which will lead to the functional failure of the relay that the coil does not work when the power is applied or the contacts cannot be reliably connected.

SUMMARY

The technical solution adopted by the present disclosure to solve its technical problem is as follows: a highly-reliable insulating ultra-small electromagnetic relay includes a coil portion and a static spring portion; the coil portion includes a bobbin; the bobbin includes two flanges, each of the two flanges being arranged at one of both ends of the bobbin; the static spring portion includes a static spring arranged on at least one end of the bobbin; the static spring includes a contact portion containing a static contact; the contact portion is arranged at a position close to the flange of the bobbin; a first retaining wall and a second retaining wall for jointly limiting a position of the contact portion of the static spring along two directions on a horizontal plane are respectively protruded upward in the flange; such that the first retaining wall and the second retaining wall are cooperated to avoid uncontrollable dispersion at the position of the contact portion of the static spring when being assembled.

According to some embodiments of the present disclosure, the relay further includes a plastic element which combines a coil portion and the static spring portion into an integral structure by the injection molding, so that the coil portion, the static spring portion and the plastic element act as the base portion of the relay, and the first retaining wall and the second retaining wall are cooperated to avoid the uncontrollable dispersion at the position of the contact portion of the static spring when the base portion is injection molded.

According to some embodiments of the present disclosure, the coil portion further includes a U-shaped iron core and an enameled wire; the U-shaped iron core is wrapped in the bobbin by the injection molding; an end head of the U-shaped iron core at each of both ends of the U-shaped iron core protrudes upward from a corresponding one of the two flanges of the bobbin, so that an end surface of the U-shaped iron core at each of the both ends of the U-shaped iron core as a pole surface is exposed outside the bobbin; the bobbin also has a winding window formed between the two flanges, and the enameled wire is wound in the winding window.

According to some embodiments of the present disclosure, a wall surface of the first retaining wall is arranged along a width direction of the relay, and the first retaining wall is blocked between the contact portion of the static spring and the enameled wire wound to the winding window of the bobbin along a length direction of the relay, so as to increase a creepage distance between the contact portion of the static spring and the enameled wire by using the first retaining wall.

According to some embodiments of the present disclosure, a wall surface of the second retaining wall is arranged along the length direction of the relay, and the second retaining wall is located between the contact portion of the static spring and the U-shaped iron core in the width direction of the relay; the second retaining wall and the first retaining wall enclose into a "L" shape, the contact portion of the static spring is in the "L" shape, and roots of the first retaining wall and the second retaining wall are outside a profile of a winding area of the enameled wire.

According to some embodiments of the present disclosure, the first retaining wall and the second retaining wall are integrally connected.

According to some embodiments of the present disclosure, a first protrusion arranged along a vertical direction is arranged at a surface of each of the first retaining wall and the second retaining wall towards the contact portion of the static spring, and the first protrusion of each of the first retaining wall and the second retaining wall abuts against a corresponding contact portion of the static spring, so as to jointly limit the contact portion of the static spring.

According to some embodiments of the present disclosure, a top portion of the first protrusion is provided as an inclined surface, and the inclined surface of the first protrusion gradually inclines downwards from inside to outside, and an outer side of the first protrusion is provided as a straight edge.

According to some embodiments of the present disclosure, a height position of a top end of each of the first retaining wall and the second retaining wall in a height direction of the relay is higher than a height position of a top end of the contact portion of the static spring in a height direction corresponding to the relay.

According to some embodiments of the present disclosure, the plastic element completely wraps the first retaining wall and the second retaining wall; or, the plastic element partially wraps the first retaining wall and the second retaining wall, and a top portion of each of the first retaining wall and the second retaining wall is exposed outside the plastic element.

According to some embodiments of the present disclosure, the coil portion further includes a permanent magnet installed between two end heads of the U-shaped iron core each of which is provided at one of both ends of the U-shaped iron core; in the flange of the bobbin, the first retaining wall and the second retaining wall are symmetrically arranged on two sides of a central line in the length direction of the relay respectively; a clamping opening for clamping the permanent magnet in the width direction of the relay is formed between two second retaining walls arranged along the width direction; a second protrusion arranged along the vertical direction is arranged on a surface of each of the two second retaining walls arranged along the width direction facing the permanent magnet, so that the permanent magnet is fixed to the bobbin by an interference fit between the second protrusion and the permanent magnet.

According to some embodiments of the present disclosure, atop portion of the second protrusion is provided as an inclined surface, and the inclined surface of the second protrusion gradually inclines downwards from inside to outside, and an outer side of the second protrusion is provided as a straight edge.

According to some embodiments of the present disclosure, in the flange of the bobbin, a third protrusion is also provided to protrude upward from a bottom surface corresponding to the clamping opening.

The present disclosure will be further described in detail with the accompanying drawings and embodiments. However, the ultra-small signal relay of the present disclosure is not limited to the embodiments.

DETAILED DESCRIPTION

The present disclosure is intended to overcome the shortcomings in the related art, and provide a highly-reliable insulating ultra-small electromagnetic relay. With structural improvement, on the one hand, the position of the contact portion of the static spring can be limited in two directions to avoid the uncontrollable divergence at the position of the contact portion of the static spring when a base is injection molded, such that the consistency of the output circuit of the relay can be improved; and on the other hand, the contact portion of the static spring can be avoided from being directly exposed above the enameled wire, the creepage distance between the input and output circuits can be increased without increasing the overall size of the relay, the dependence on increasing the creepage distance by the plastic of the base is reduced, and at the same time, the insulation effect of the relay can be avoided from being affected by the environmental temperature, moisture change and the like in use, such that the environmental resistance of the relay can be improved.

Embodiments

Figure 1:
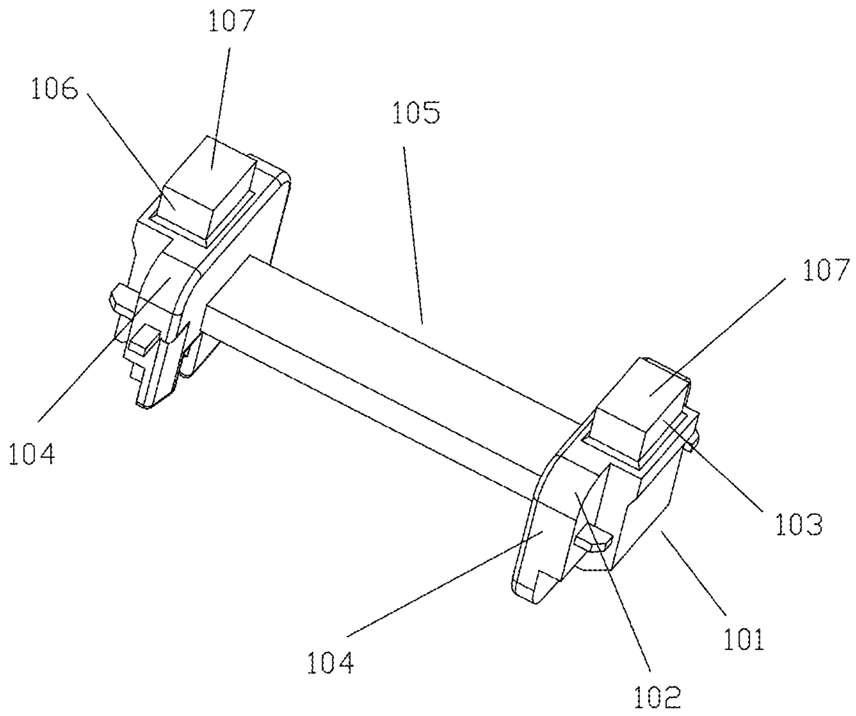
prior art FIG. 1
FIG. 1 is a schematic structural perspective view of a bobbin portion of an electromagnetic relay in the related art.
Figure 2:
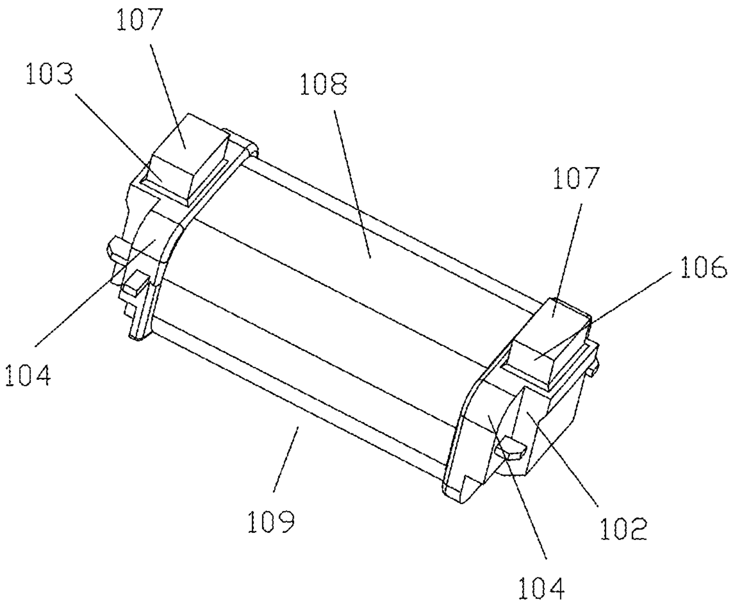
prior art FIG. 2
FIG. 2 is a schematic structural perspective view of a coil portion of the electromagnetic relay in the related art.
Figure 3:
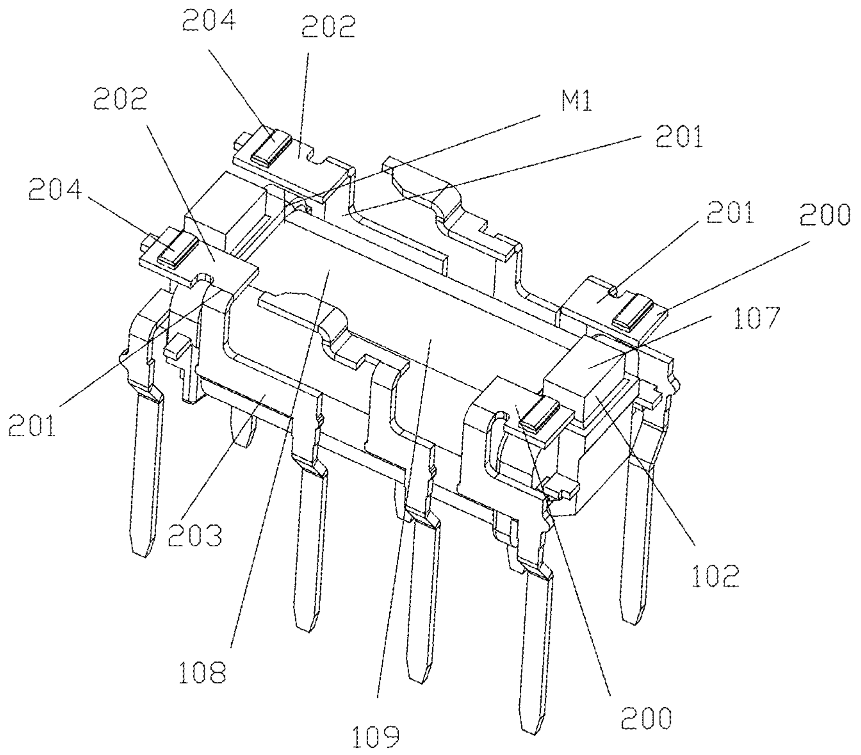
prior art FIG. 3
FIG. 3 is a schematic view of cooperating position of the coil portion and the static spring portion of the electromagnetic relay in the related art.
Figure 4:
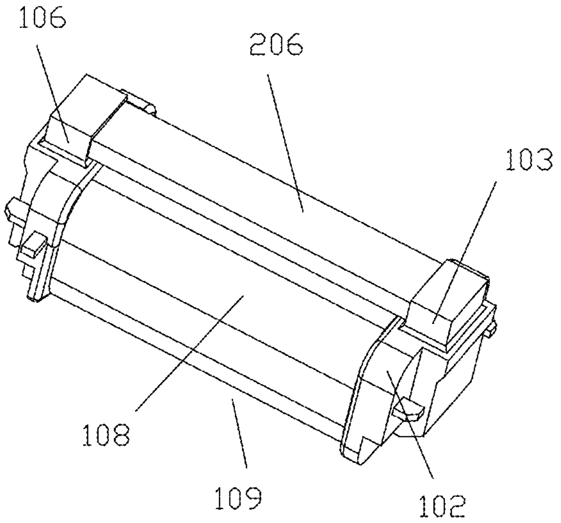
prior art FIG. 4
FIG. 4 is a schematic structural perspective view of the coil portion (including a permanent magnet) of the electromagnetic relay in the related art.
Figure 5:
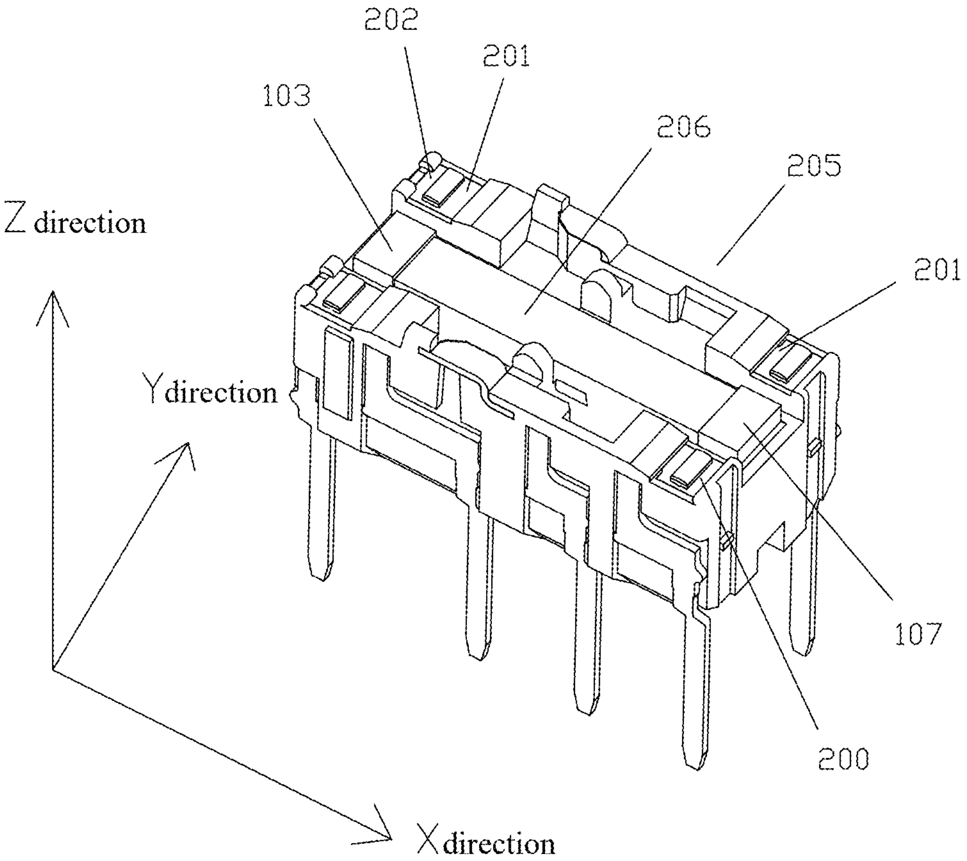
prior art FIG. 5
FIG. 5 is a schematic structural perspective view of a base portion of the electromagnetic relay in the related art.
Figure 6:
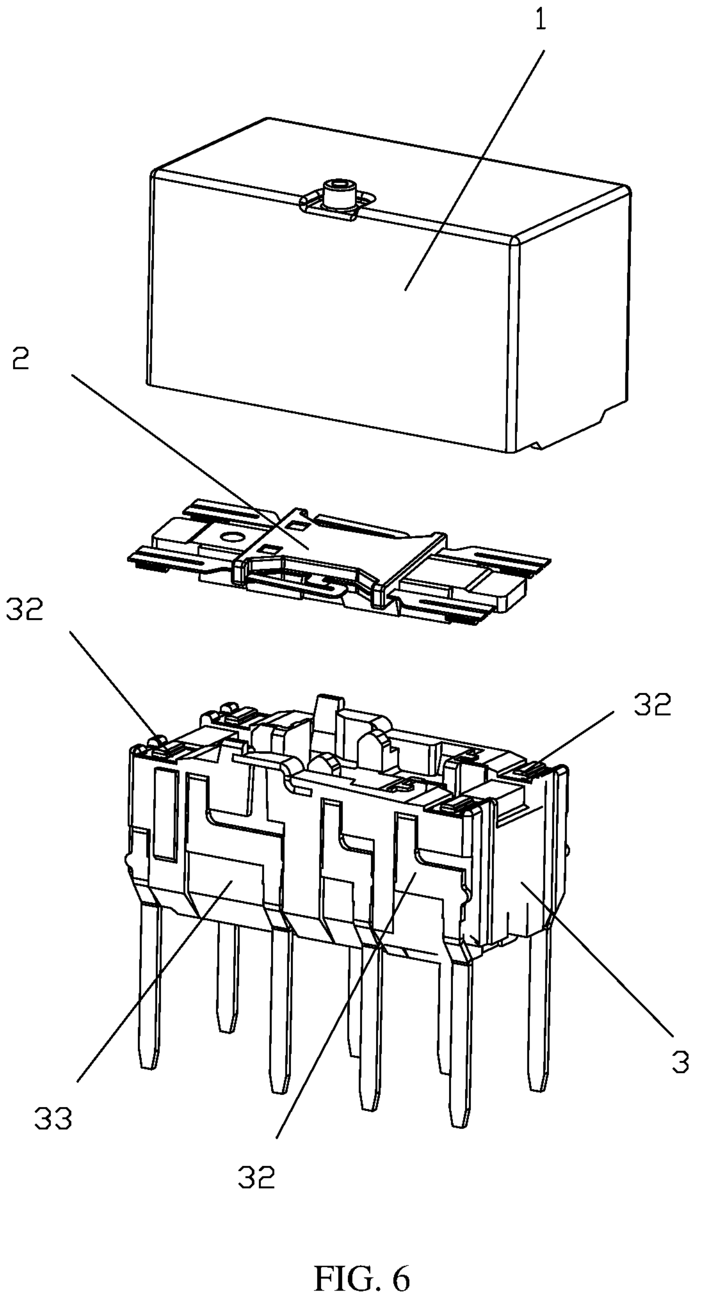
FIG. 6 is an exploded schematic structural perspective view according to an embodiment of the present disclosure.
Figure 7:
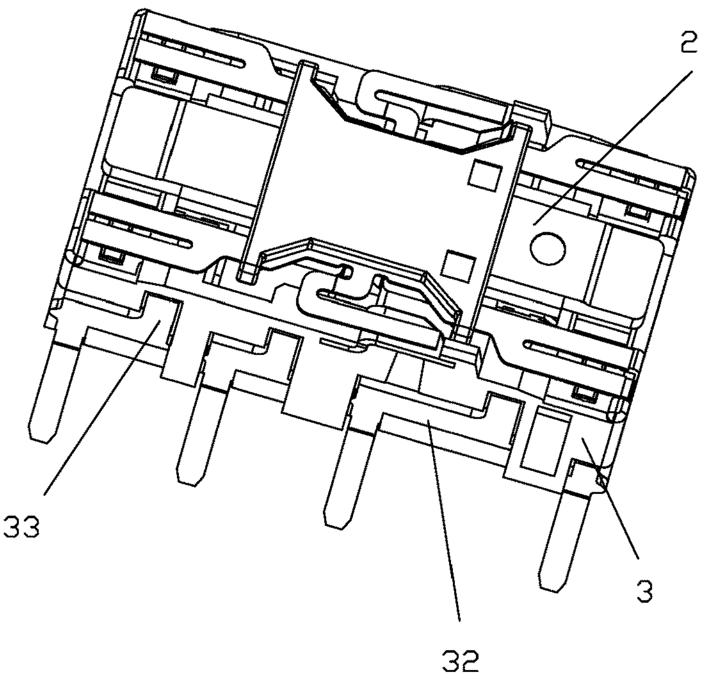
FIG. 7 is a schematic structural perspective view according to the embodiment of the present disclosure (without a housing)
Figure 8:
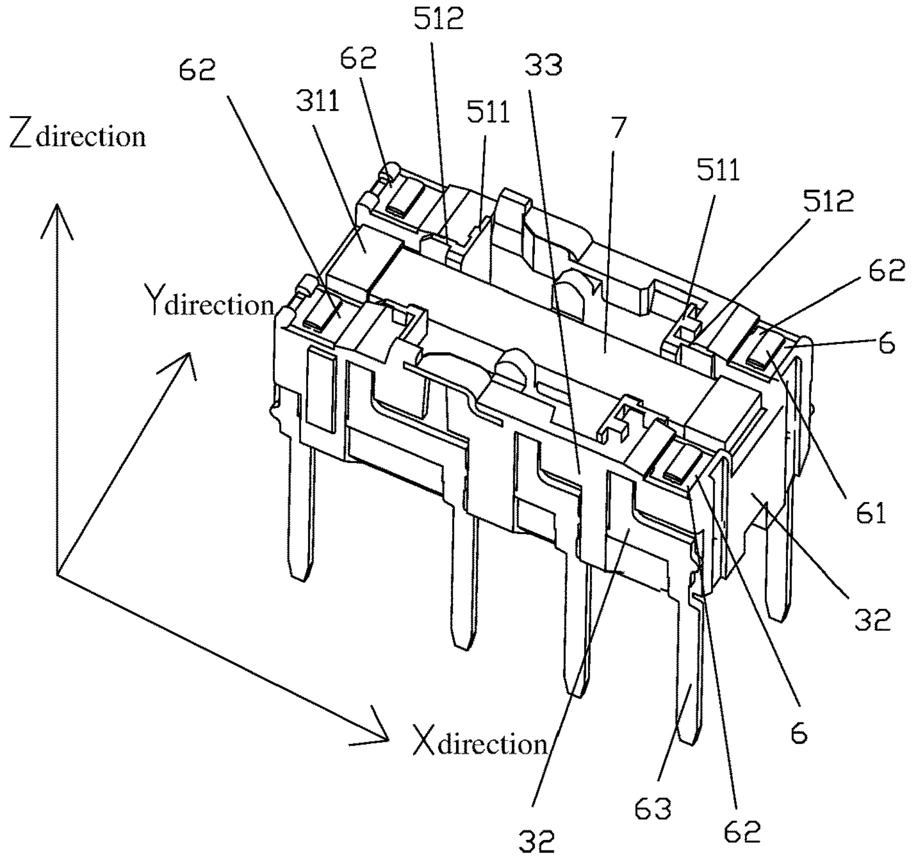
FIG. 8 is a schematic structural perspective view of a base portion of the embodiment of the present disclosure.
Figure 9:
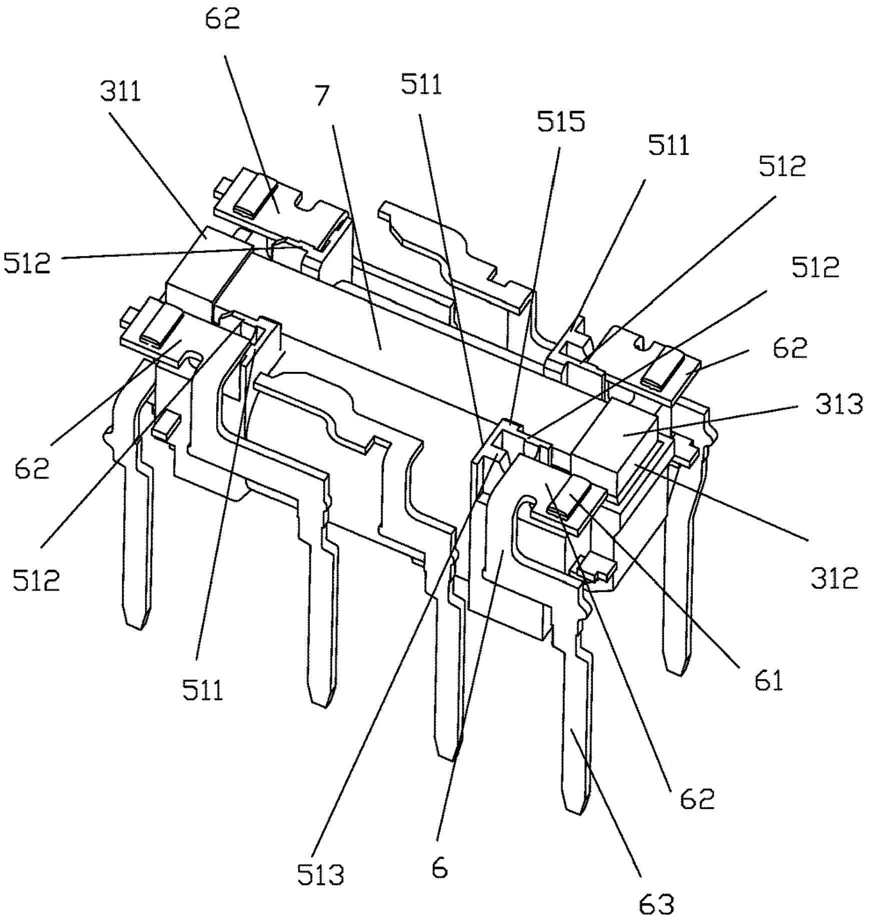
FIG. 9 is a schematic view of cooperating position of a coil portion (including a permanent magnet) and the static spring portion according to the embodiment of the present disclosure.
Figure 10:
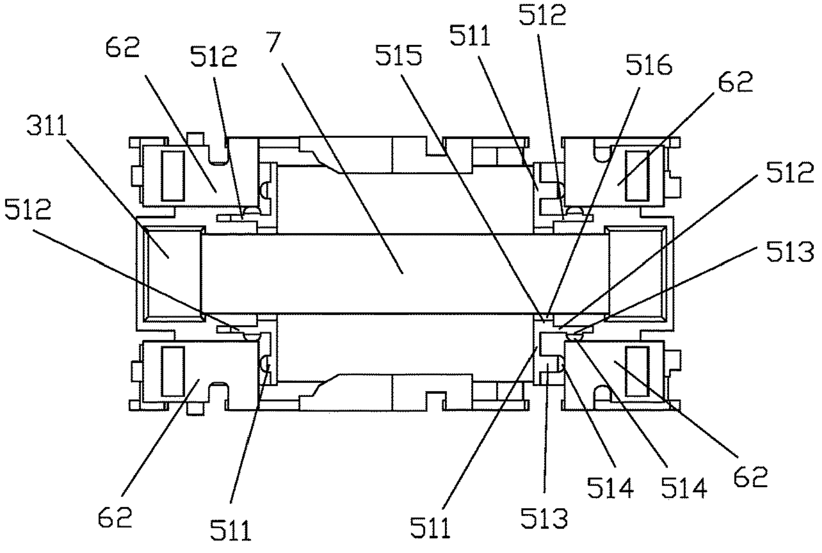
FIG. 10 is a top view of the cooperating position of the coil portion (including the permanent magnet) and the static spring portion according to the embodiment of the present disclosure.
Figure 15:
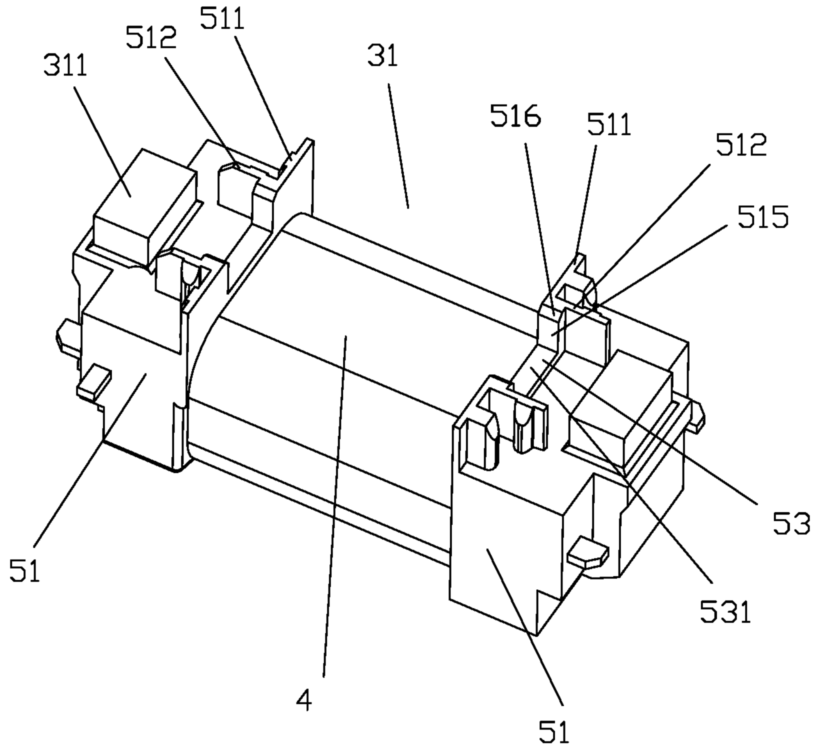
FIG. 15 is a schematic structural perspective view of the coil portion (excluding the permanent magnet) according to the embodiment of the present disclosure.
Figure 16:
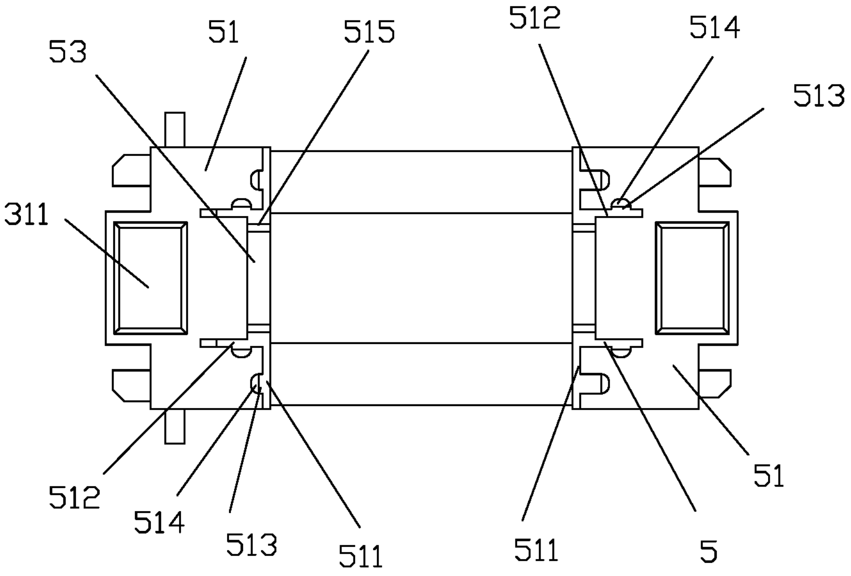
FIG. 16 is a top view of the coil portion (excluding the permanent magnet) according to the embodiment of the present disclosure.
Figure 17:
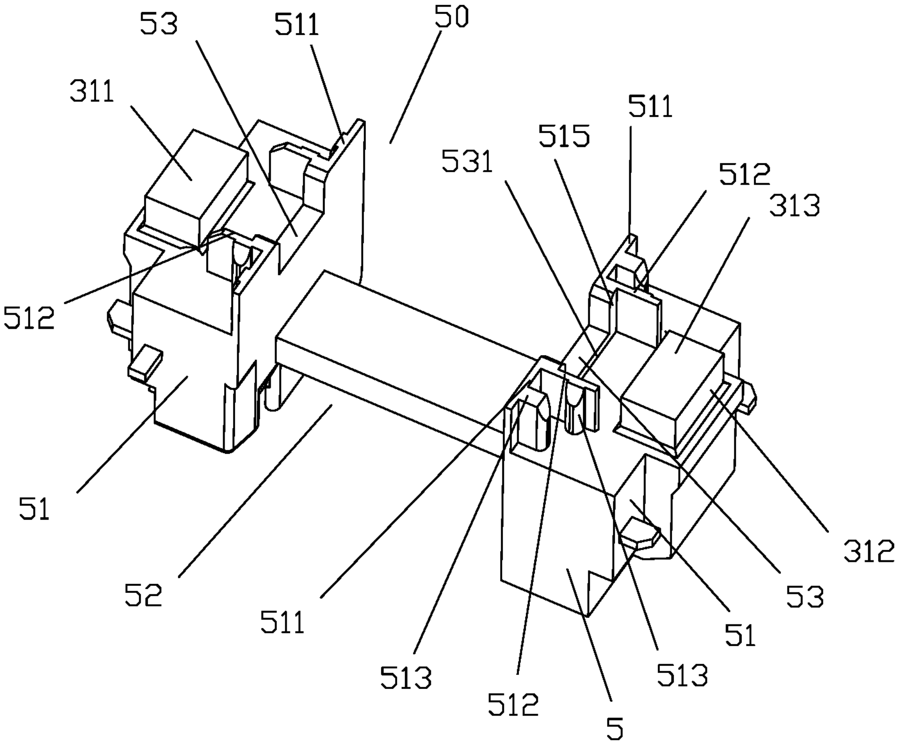
FIG. 17 is a schematic structural perspective view of a bobbin portion according to the embodiment of the present disclosure.
Figure 18:
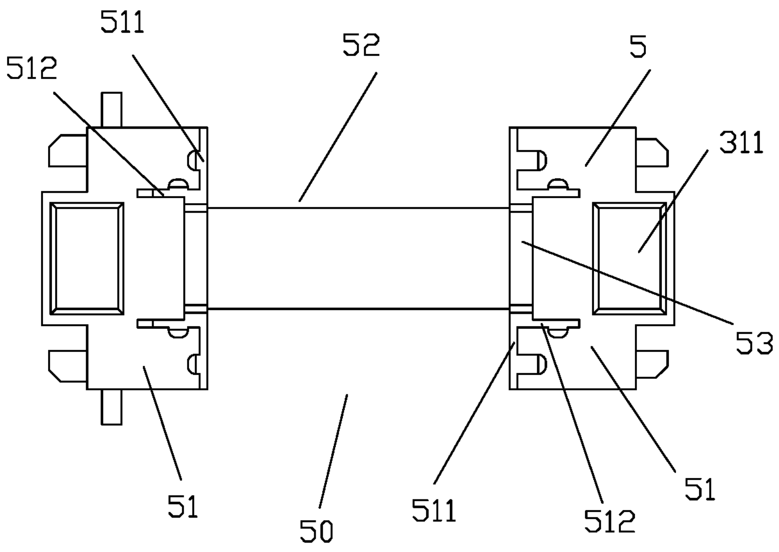
FIG. 18 is atop view of the bobbin portion according to the embodiment of the present disclosure.
Figure 19:
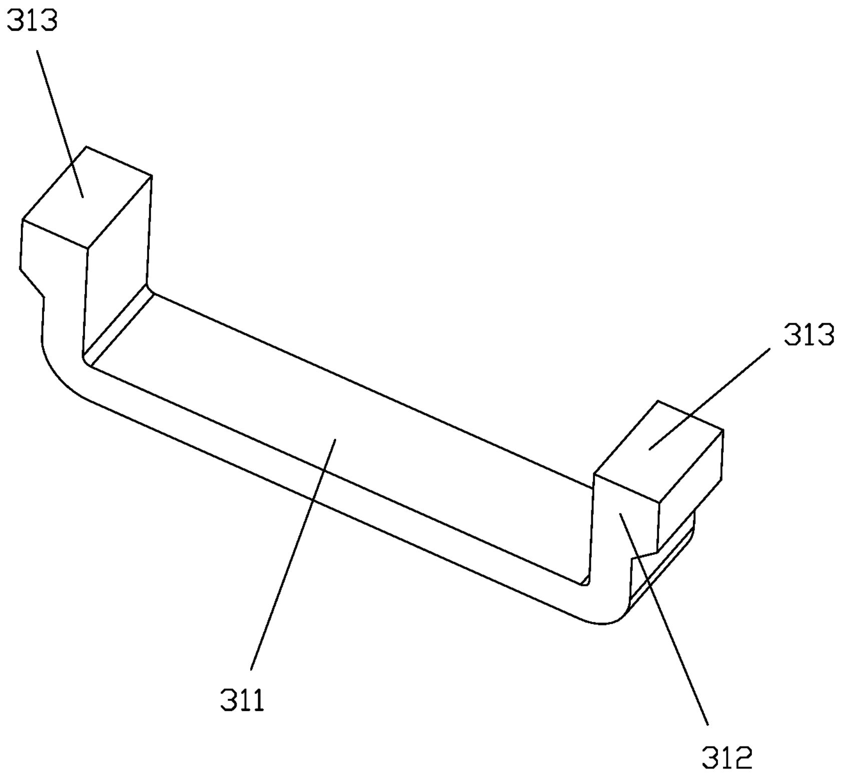
FIG. 19 is a schematic structural perspective view of a U-shaped iron core according to the embodiment of the present disclosure.

Referring to FIGS. 6 to 19, a highly-reliable insulating ultra-small electromagnetic relay of the present disclosure includes a housing 1, a movable spring armature portion 2 and a base portion 3 (as shown in FIG. 6), wherein the movable spring armature portion 2 is integrally formed by combining and injection molding two sets of movable springs and armatures, and each one of the two sets of movable springs is provided with a normally open end contact and a normally closed end contact, and the movable spring armature portion 2 is welded with a static spring portion in the base portion 3 through materials at the positioning location to form a seesaw structure, so that the normally open end contact and the normally closed end contact of the movable spring are respectively fitted with the normally open static spring contact and the normally closed static spring contact. The base portion 3 includes a coil portion 31, a static spring portion 32, and a plastic element 33 which combines the coil portion 31 and the static spring portion 32 into an integral structure by injection molding (as shown in FIG. 8). The plastic element 33 is equivalent to the base; the coil portion 31 includes a U-shaped iron core 311, a bobbin 5 in which the U-shaped iron core 311 is wrapped by injection molding, and an enameled wire 4 wound around the bobbin 5 (as shown in FIGS. 15 and 16), wherein the U-shaped iron core 311 and the bobbin 5 form a bobbin portion 50. The bobbin 5 includes flanges 51 at both end portions and a winding window 52 between the flanges for winding the enameled wire. An end head 312 of the U-shaped iron core 311 at each of both ends thereof protrudes upward from a corresponding one of the two flanges 51 at both ends of the bobbin 5 respectively, so that two end surfaces of the U-shaped iron core 311 as pole surfaces 313 are exposed outside the bobbin 5 (as shown in FIGS. 18-19). The static spring portion 32 includes a plurality of static springs 6 (as shown in FIG. 9) at the normally open end and/or the normally closed end. The upper part of the static spring 6 is provided as a contact portion 62 having a static contact 61, and the lower part thereof is provided as a lead-out pin 63; the contact portion 62 of the static spring is arranged at a position close to the flange 51 of the bobbin 5. In the flange 51 of the bobbin 5, a first retaining wall 511 and a second retaining wall 512 for jointly limiting a position of the contact portion 62 of the static spring 6 in two directions on a horizontal plane are respectively protruded upward, so that the first retaining wall 511 and the second retaining wall 512 are cooperated to avoid uncontrollable divergence of the position of the contact portion 62 of the static spring 6 when the base portion 3 is injection molded.

In the present disclosure, limitation of the orientations such as “upper” and “lower” in technical features only indicates the relative positional relationship between components or structures in the components. For example, the upper part and the lower part of the static spring 6 refer to an upper feature and a lower feature of the static spring 6 when the static spring 6 is fitted to the bobbin 5 and the two end heads 312 of the U-shaped iron core 311 are facing upward respectively.

Figure 11:
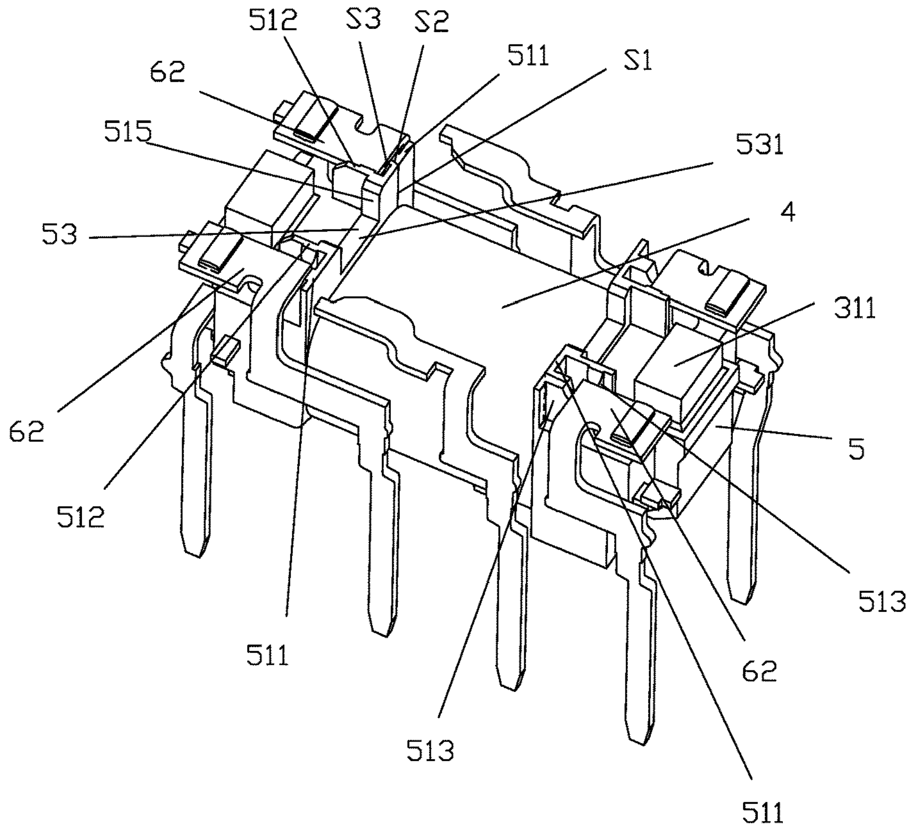
FIG. 11 is a schematic view of the cooperating position of the coil portion (excluding the permanent magnet) and the static spring portion according to the embodiment of the present disclosure.
Figure 12:
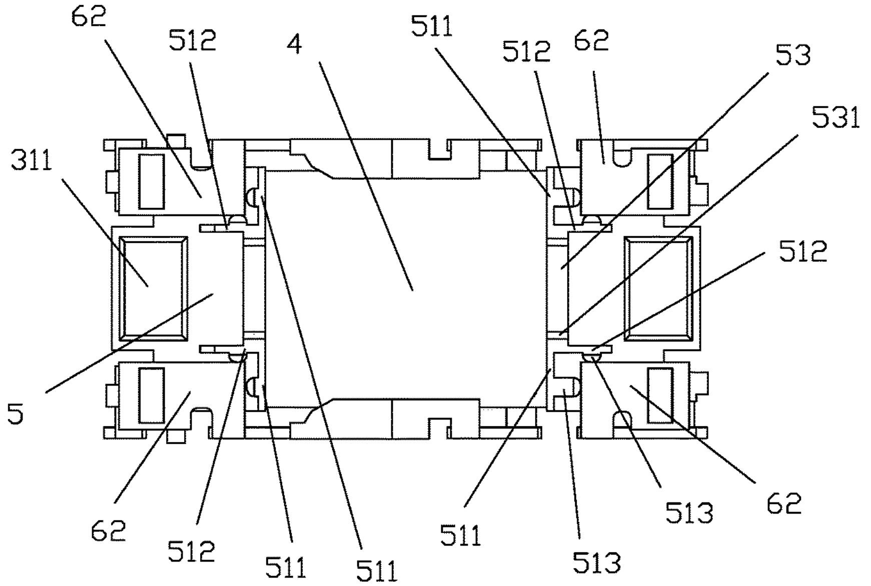
FIG. 12 is a top view of the cooperating position of the coil portion (excluding the permanent magnet) and the static spring portion according to the embodiment of the present disclosure.
Figure 13:
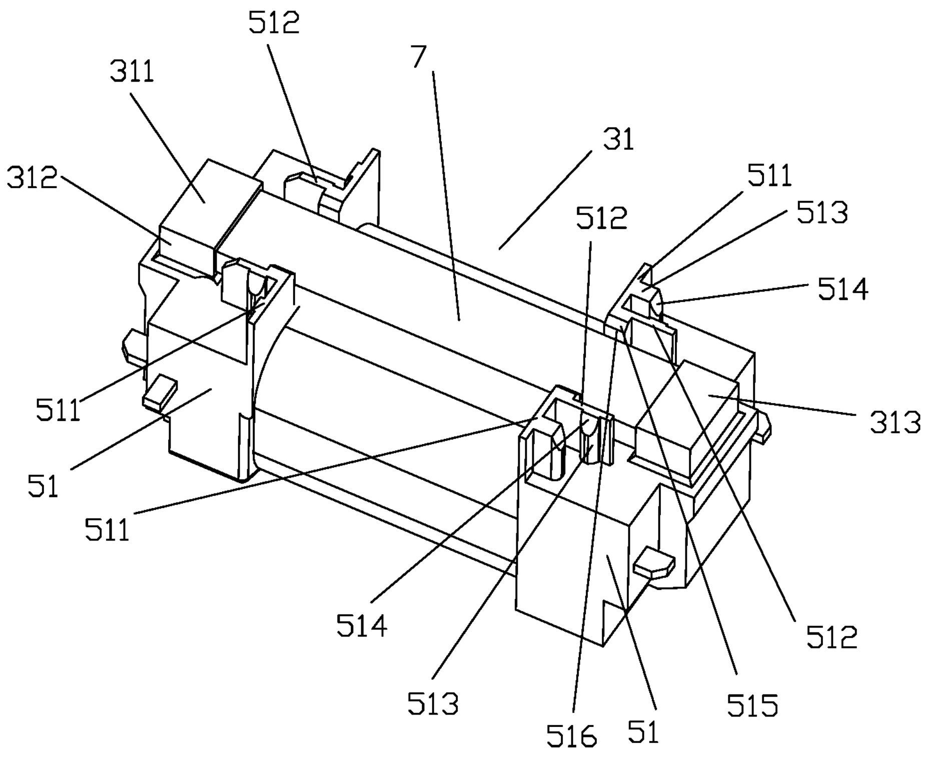
FIG. 13 is a schematic structural perspective view of the coil portion (including the permanent magnet) according to the embodiment of the present disclosure.
Figure 14:
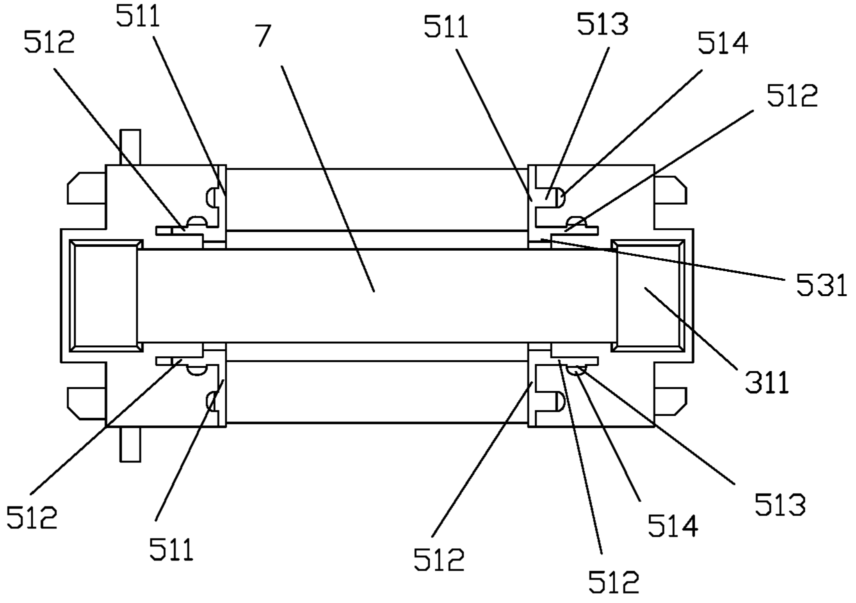
FIG. 14 is a top view of the coil portion (including the permanent magnet) according to the embodiment of the present disclosure.

In this embodiment, a wall surface of the first retaining wall 511 is arranged along a width direction of the relay, and the first retaining wall 511 is blocked between the contact portion 62 of the static spring 6 and the enameled wire 4 wound in the winding window 52 of the bobbin in a length direction of the relay, to increase a creepage distance between the contact portion 62 of the static spring 6 and the enameled wire 4 by using the first retaining wall 511. As shown in FIG. 11, the creepage distance between the contact portion 62 of the static spring 6 and the enameled wire 4 includes three sections, that is, a first section S1 which is from the enameled wire 4 to a top end of the first retaining wall 511 along an outside surface of the first retaining wall 511, a second section S2 which refers to a width of the top end of the first retaining wall 511, and a third section S3 which is from the top end of the first retaining wall 511 to the contact portion 62 of the static spring 6 along an inside surface of the first retaining wall 511. The inside surface of the first retaining wall 511 refers to a face of the first retaining wall 511 towards the contact portion 62 of the static spring 6, and the outside surface of the first retaining wall 511 refers to a face of the first retaining wall 511 away from the contact portion 62 of the static spring 6. In addition, the length direction of the relay refers to a length direction of the U-shaped bottom wall of the U-shaped iron core 311, which is a X direction as shown in FIG. 8, and the width direction of the relay is a Y direction, and a height direction of the relay is a Z direction.

In this embodiment, a wall surface of the second retaining wall 512 is arranged along the length direction of the relay, and the second retaining wall 512 is located between the contact portion 62 of the static spring 6 and the U-shaped iron core 311 in the width direction of the relay. The second retaining wall 512 and the first retaining wall 511 enclose into a “L” shape, the contact portion 62 of the static spring 6 is located inside the “L” shape, and roots of the first retaining wall 511 and the second retaining wall 512 are located outside a profile of a winding area of the enameled wire 4. The first retaining wall 511 and the second retaining wall 512 of the present disclosure are located outside the winding window 52 of the bobbin in the Z direction without occupying the winding window 52. The contact portion 62 of the static spring 6 is located inside the L-shaped retaining wall, and outside the winding window 52 of the bobbin in the X and Y directions, to avoid directly facing the enameled wire of the coil.

In this embodiment, the first retaining wall 511 and the second retaining wall 512 are integrally connected. Of course, the first retaining wall 511 and the second retaining wall 512 may also enclose into a “L” shape but not be connected.

In this embodiment, a first protrusion 513 arranged along the vertical direction (i.e., the Z direction) is provided at a surface of each of the first retaining wall 511 and the second retaining wall 512 towards the contact portion 62 of the static spring 6 (i.e., an inside surface), and the first protrusion 513 abuts against the corresponding contact portion 62 of the static spring 6, to jointly limit the position of the contact portion 62 of the static spring 6. With the arrangement of the first protrusion 513 for limiting the position of the static spring 6, the contact area can be reduced, and thus the generation of plastic chips can be reduced.

In this embodiment, atop portion of the first protrusion 513 is provided as an inclined surface 514, which gradually inclines downward from the inside to the outside, and an outer side of the first protrusion 513 is provided as a straight edge. An inner side of the first protrusion 513 refers to a side thereof that is connected with the first retaining wall 511 or the second retaining wall 512, and the outer side of the first protrusion 513 refers to a side thereof that is not connected with the first retaining wall 511 or the second retaining wall 512. With the top portion of the first protrusion 513 being provided as the inclined surface 514, it is convenient for the contact portion 62 of the static spring 6 to be guided and positioned in place; and by arranging the outer side of the first protrusion 513 as a straight edge, the difficulty in machining accuracy can be reduced.

In this embodiment, a height position of a top end of each of the first retaining wall 511 and the second retaining wall 512 in a height direction of the replay is higher than a height position of a top end of the contact portion 62 of the static spring 6 corresponding to a height direction of the relay (that is, the Z direction).

In this embodiment, the plastic element 33 partially wraps the first retaining wall 511 and the second retaining wall 512, and top portions of the first retaining wall 511 and the second retaining wall 512 are exposed outside the plastic element 33. Of course, the plastic element 33 may also be designed to completely wrap the first retaining wall 511 and the second retaining wall 512 as required.

The first retaining wall 511 and the second retaining wall 512 on the bobbin 5 are allowed to be partially exposed in the Z direction of the relay after being combined and injection molded to be the base portion 3, to ensure an overall miniaturization of the relay as much as possible. However, it is sometimes designed to be covered by a plastic of the base to appropriately reduce the machining difficulty of a base mold. After the first retaining wall 511 and the second retaining wall 512 of the bobbin 5 are partially or completely covered by the plastics of the base portion 3, the rigidity of the first retaining wall 511 and the second retaining wall 512 can be further improved, and the shape consistency of the relay under the change of external conditions such as temperature shock can be improved, so that the relay performance to resist the change of external environment can be improved.

In this embodiment, the coil portion 31 further includes a permanent magnet 7 installed between the two end heads 312 of the U-shaped iron core 311. In the flange 51 of the bobbin 5, first retaining walls 511 and second retaining walls 512 are symmetrically arranged on two sides of a central line of the relay in the length direction respectively. A clamping opening 53 for clamping the permanent magnet 7 in the width direction of the relay is formed between two second retaining walls 512 in the width direction. A second protrusion 515 arranged along the vertical direction is provided at a surface of each of the two second retaining walls 512 (which are arranged along the width direction) facing the permanent magnet 7, so that the permanent magnet 7 is fixed to the bobbin 5 by the interference fit between the second protrusions 515 of the two second retaining walls 512 in the flange 51 of the bobbin 5 at the same side and the corresponding ends of the permanent magnet 7, that is, the two ends of the permanent magnet 7 are respectively in interference fit with four second protrusions 515 of the second retaining walls 512 of two flanges 51 of the bobbin 5. In this embodiment, four sets of the first retaining walls 511 and the second retaining walls 512 are provided. The number of first retaining walls 511 and second retaining walls 512 can be adjusted according to the output circuit of the relay, but the clamping position where the permanent magnet is fixed may be maintained. By providing the second protrusion 515, the permanent magnet 7 is fixed by the interference fit, which can reduce the contact area, and then reduce the generation of plastic chips.

In this embodiment, a top portion of the second protrusion 515 is provided as an inclined surface 516, which gradually inclines downward from the inside to the outside, and an outer side of the second protrusion 515 is provided as a straight edge. By providing the top portion of the second protrusion 515 as the inclined surface 516, it is convenient for the permanent magnet 7 to be guided and installed in place. By providing the outer side of the second protrusion 515 as the straight edge, the difficulty in machining accuracy can be reduced.

In this embodiment, in the flange 51 of the bobbin 5, a third protrusion 531 is also provided to protrude upward from a bottom surface corresponding to the clamping opening 53. The third protrusion 531 plays a role of increasing a creepage distance between the contact portion 62 of the static spring 6 and the enameled wire 4, and can also be used to support the permanent magnet 7 so as to avoid crushing the enameled wire.

It should be noted that the permanent magnet 7 is not necessary, for example, the relay coil works only in a monostable manner.

In the highly-reliable insulating ultra-small electromagnetic relay of the present disclosure, the first retaining wall 511 and the second retaining wall 512 protrude upward in the flange 51 of the bobbin 5 for limiting the contact portion 62 of the static spring 6 in two directions on a horizontal plane. This structure of the present disclosure enables the contact portion 62 of the static spring 6 to be limited in two directions by the cooperation of the first retaining wall 511 and the second retaining wall 512, to avoid uncontrollable position divergence of the contact portion 62 of the static spring 6 when being injected into the base portion 3, so as to improve the consistency of the output circuit of the relay.

In the highly-reliable insulating ultra-small electromagnetic relay of the present disclosure, the wall surface of the first retaining wall 511 is arranged along the width direction of the relay, and the first retaining wall 511 is blocked between the contact portion 62 of the static spring 6 and the enameled wire 4 wound in the winding window 52 of the bobbin 5 in the length direction of the relay, and the height position of the top end of each of the first retaining wall 511 and the second retaining wall 512 corresponding to the height direction of the relay is arranged to be higher than the height position of the top end of the contact portion 62 of the static spring 6 corresponding to the height direction of the relay. This structure of the present disclosure can avoid the contact portion 62 of the static spring 6 from being directly exposed above the enameled wire 4, increase the creepage distance between the input and output circuits without increasing the overall size of the relay, and reduce the dependence on increasing the creepage distance by the plastic of the base, while avoiding the insulation effect of the relay from being affected by the environmental temperature, moisture change and the like in use, so that the environmental resistance of the relay can be improved.

In the highly-reliable insulating ultra-small electromagnetic relay of the present disclosure, the first retaining walls 511 and the second retaining walls 512 are symmetrically arranged on two sides of a central line of the relay along the length direction in the flange 51 of the bobbin 5; and a clamping opening 53 for clamping the permanent magnet 7 in the width direction of the relay is formed between the two second retaining walls 512 in the width direction; a second protrusion 515 arranged vertically is provided at a surface of each of the two second retaining walls 512 facing the permanent magnet, so that the permanent magnet 7 is fixed to the bobbin 5 by the interference fit between the two second protrusions 515 and the permanent magnet 7. This structure of the present disclosure can avoid the disadvantage caused by that the permanent magnet and the iron core in the related art can be positioned by the laser welding, that is, which can not only avoid the generation of foreign matters such as the welding slag, but also reduce the number of processing procedures and manufacturing difficulty.

Compared with the related art, beneficial effects of the present disclosure are as follows:

1. In the present disclosure, a first retaining wall and a second retaining wall used for jointly limiting the position of the contact portion of the static spring in two directions on a horizontal plane are respectively and protruded upward in the flange of the bobbin. According to this structure of the present disclosure, the first retaining wall and the second retaining wall are cooperated to limit the contact portion of the static spring in two directions, to avoid the uncontrollable divergence of the position of the contact portions of the static spring when being assembly, especially when being injected into the base portion, so as to improve the consistency of the output circuit of the relay.
2. In the present disclosure, the wall surface of the first retaining wall is arranged along the width direction of the relay, and the first retaining wall is blocked between the contact portion of the static spring and the enameled wire wound to a winding window of the bobbin in the length direction of the relay, and a height position of the top end of each of the first retaining wall and the second retaining wall in a height direction of the replay is arranged higher than a height position of the top end of the contact portion of the static spring corresponding to the height direction of the relay. This structure of the present disclosure can avoid the contact portion of the static spring from being directly exposed above the enameled wire, increase the creepage distance between the input and output circuits without increasing an overall size of the relay, reduce dependence on increasing the creepage distance by the plastic of the base, while avoiding an insulation effect of the relay from being affected by the environmental temperature, moisture change and the like during use, so that the environmental resistance of the relay can be improved.
3. In the present disclosure, the first retaining walls and the second retaining walls are symmetrically arranged on both sides of a central line of the relay along the length direction in the flange of the bobbin; and a clamping opening for clamping the permanent magnet in the width direction of the relay is formed between two second retaining walls in the width direction; a second protrusion arranged vertically is provided at a surface of each of the two second retaining walls facing the permanent magnet, so that the permanent magnet is fixed to the bobbin by an interference fit between the two second protrusions and the permanent magnet. The structure of the present disclosure can avoid the disadvantage caused by that the permanent magnet and the iron core in the related art are positioned by the laser welding.

The above contents are only the preferred embodiments of the present disclosure, and are not intended to limit the present disclosure in any form. Although the present disclosure has been disclosed above with preferred embodiments, it is not intended to limit the present disclosure. Without departing from the scope of the technical solution of the present disclosure, any skilled in the art can make possible changes and modifications to the technical solution of the present disclosure by using the technical contents disclosed above, or modify the technical solution into any of equivalent embodiments. Therefore, any simple modifications, equivalent changes and modifications made to the above embodiments according to the technical essence of the present disclosure, without going beyond the contents of the technical solution of the present disclosure, should fall within the protection scope of the technical solution of the present disclosure.

What is claimed is:

1. A highly-reliable insulating ultra-small electromagnetic relay, comprising a coil portion and a static spring portion;

the coil portion comprising a bobbin;

the bobbin comprising two flanges, each of the two flanges being arranged at one of both ends of the bobbin;

the static spring portion comprising a static spring on at least one end of the bobbin;

wherein the static spring comprises a contact portion containing a static contact; the contact portion is arranged at a position close to the flange of the bobbin; and the flange comprises a first retaining wall and a second retaining wall protruded upwardly for jointly limiting a position of the contact portion of the static spring in two directions on a horizontal plane, a wall surface of the first retaining wall is arranged along a width direction of the relay, a wall surface of the second retaining wall is arranged along the length direction of the relay, the second retaining wall and the first retaining wall enclose into a "L" shape, the contact portion of the static spring is located inside the "L" shape, such that the first retaining wall and the second retaining wall are cooperated with the contact portion of the static spring to avoid uncontrollable dispersion at the position of the contact portion of the static spring when being assembled.

2. The highly-reliable insulating ultra-small electromagnetic relay according to claim 1, wherein the relay further comprises a plastic element which combines a coil portion and the static spring portion into an integral structure by injection molding, so that the coil portion, the static spring portion and the plastic element act as a base portion of the relay, and the first retaining wall and the second retaining wall are cooperated to avoid uncontrollable dispersion at a position of the contact portion of the static spring when the base portion is injection molded.

3. The highly-reliable insulating ultra-small electromagnetic relay according to claim 2, wherein the coil portion further comprises a U-shaped iron core and an enameled wire; the U-shaped iron core is wrapped in the bobbin by injection molding; an end head of the U-shaped iron core at each of both ends of the U-shaped iron core protrudes upward from a corresponding one of the two flanges of the bobbin, so that an end surface of the U-shaped iron core at each of the both ends of the U-shaped iron core as a pole surface is exposed outside the bobbin; the bobbin also has a winding window formed between the two flanges, and the enameled wire is wound in the winding window.

4. The highly-reliable insulating ultra-small electromagnetic relay according to claim 3, wherein the first retaining wall is blocked between the contact portion of the static spring and the enameled wire wound to the winding window of the bobbin in a length direction of the relay, so as to increase a creepage distance between the contact portion of the static spring and the enameled wire by using the first retaining wall.

5. The highly-reliable insulating ultra-small electromagnetic relay according to claim 4, wherein the second retaining wall is located between the contact portion of the static spring and the U-shaped iron core in the width direction of the relay; and roots of the first retaining wall and the second retaining wall are outside a profile of a winding area of the enameled wire.

6. The highly-reliable insulating ultra-small electromagnetic relay according to claim 5, wherein the first retaining wall and the second retaining wall are integrally connected.

7. The highly-reliable insulating ultra-small electromagnetic relay according to claim 5, wherein a first protrusion arranged along a vertical direction is arranged at a surface of each of the first retaining wall and the second retaining wall towards the contact portion of the static spring, and the first protrusion of each of the first retaining wall and the second retaining wall abuts against a corresponding contact portion of the static spring, so as to jointly limit the contact portion of the static spring.

8. The highly-reliable insulating ultra-small electromagnetic relay according to claim 7, wherein a top portion of the first protrusion is provided as an inclined surface, and the inclined surface of the first protrusion gradually inclines downwards from inside to outside, and an outer side of the first protrusion is provided as a straight edge.

9. The highly-reliable insulating ultra-small electromagnetic relay according to claim 5, wherein a height position of a top end of each of the first retaining wall and the second retaining wall in a height direction corresponding to the relay is higher than a height position of a top end of the contact portion of the static spring in a height direction corresponding to the relay.

10. The highly-reliable insulating ultra-small electromagnetic relay according to claim 5, wherein the plastic element completely wraps the first retaining wall and the second retaining wall; or, the plastic element partially wraps the first retaining wall and the second retaining wall, and a top portion of each of the first retaining wall and the second retaining wall is exposed outside the plastic element.

11. The highly-reliable insulating ultra-small electromagnetic relay according to claim 5, wherein the coil portion further comprises a permanent magnet installed between two end heads of the U-shaped iron core each of which is provided at one of both ends of the U-shaped iron core; in the flange of the bobbin, the first retaining wall and the second retaining wall are symmetrically arranged on two sides of a central line in the length direction of the relay respectively; a clamping opening for clamping the permanent magnet in the width direction of the relay is formed between two second retaining walls arranged along the width direction; a second protrusion arranged along the vertical direction is arranged on a surface of each of the two second retaining walls arranged along the width direction facing the permanent magnet, so that the permanent magnet is fixed to the bobbin by an interference fit between the second protrusion and the permanent magnet, wherein a top portion of the second protrusion is provided as an inclined surface, and the inclined surface of the second protrusion gradually inclines downwards from inside to outside, and an outer side of the second protrusion is provided as a straight edge; in the flange of the bobbin, a third protrusion is also provided to protrude upward from a bottom surface corresponding to the clamping opening.

* * * * *